(12) United States Patent
Mazzei et al.

(10) Patent No.: US 6,543,480 B1
(45) Date of Patent: Apr. 8, 2003

(54) LAUNDRY FAUCET VALVE AND TIMER CONTROL

(76) Inventors: Dom Mazzei, 6 Cynthia Street, Thorold, Ontario (CA), L2V 1W7; Frank Pieters, 108 Maywood, Pointe-Claire, Quebec (CA), H9R 3L8

( * ) Notice: Subject to any disclaimer, the term of this patent is extended or adjusted under 35 U.S.C. 154(b) by 0 days.

(21) Appl. No.: 10/038,627

(22) Filed: Jan. 8, 2002

(51) Int. Cl.⁷ .............................................. F16K 11/065
(52) U.S. Cl. ............................ 137/624.12; 137/625.18
(58) Field of Search ....................... 137/624.11, 624.12, 137/360, 625.18

(56) References Cited

U.S. PATENT DOCUMENTS

| | | | |
|---|---|---|---|
| 1,035,472 A | 8/1912 | Rogge | |
| 1,571,810 A | 2/1926 | Shimp | |
| 2,520,591 A | 8/1950 | Wilmarth | |
| 2,997,273 A | 8/1961 | Nilsen | |
| 3,090,396 A | 5/1963 | Rudelick | |
| 3,475,002 A | 10/1969 | Phillips | |
| 3,661,181 A | 5/1972 | Palmer et al. | |
| 3,848,616 A * | 11/1974 | Sanner | 137/78 |
| 3,865,139 A | 2/1975 | Tolnai | |
| 4,118,005 A | 10/1978 | O'Neil et al. | |
| 4,351,360 A | 9/1982 | Smyth | |
| 4,355,659 A | 10/1982 | Kelchner | |
| 4,488,567 A | 12/1984 | Grant | |
| 4,522,221 A | 6/1985 | Chivens et al. | |
| 4,562,865 A | 1/1986 | Lemkin et al | |
| 4,880,032 A | 11/1989 | Doutt | |
| 4,921,209 A | 5/1990 | Moineau | |
| 4,930,549 A | 6/1990 | Renner | |
| 5,402,812 A | 4/1995 | Moineau et al. | |
| 5,699,825 A | 12/1997 | Norton | |
| 5,806,554 A | 9/1998 | Mieth | |
| 5,918,617 A * | 7/1999 | Garth | 137/624.11 X |
| 5,992,218 A | 11/1999 | Tryba | |
| 6,389,852 B1 * | 5/2002 | Montgomery | 137/360 X |

* cited by examiner

*Primary Examiner*—Kevin Lee
(74) *Attorney, Agent, or Firm*—John R. S. Orange; Mc Carthy Tetrault LLP

(57) ABSTRACT

A valve for controlling a flow of water to an appliance comprises a valve assembly having a pair of inlets for coupling to a water supply and a pair of outlets for supplying water to the appliance. A valve mechanism is coupled to the valve assembly to control the flow of water from the inlets to the outlets. A timer is coupled to the valve mechanism to control the valve mechanism and thereby control the flow of water. The timer allows water to flow from said inlets to said outlets for a preset length of time.

5 Claims, 3 Drawing Sheets

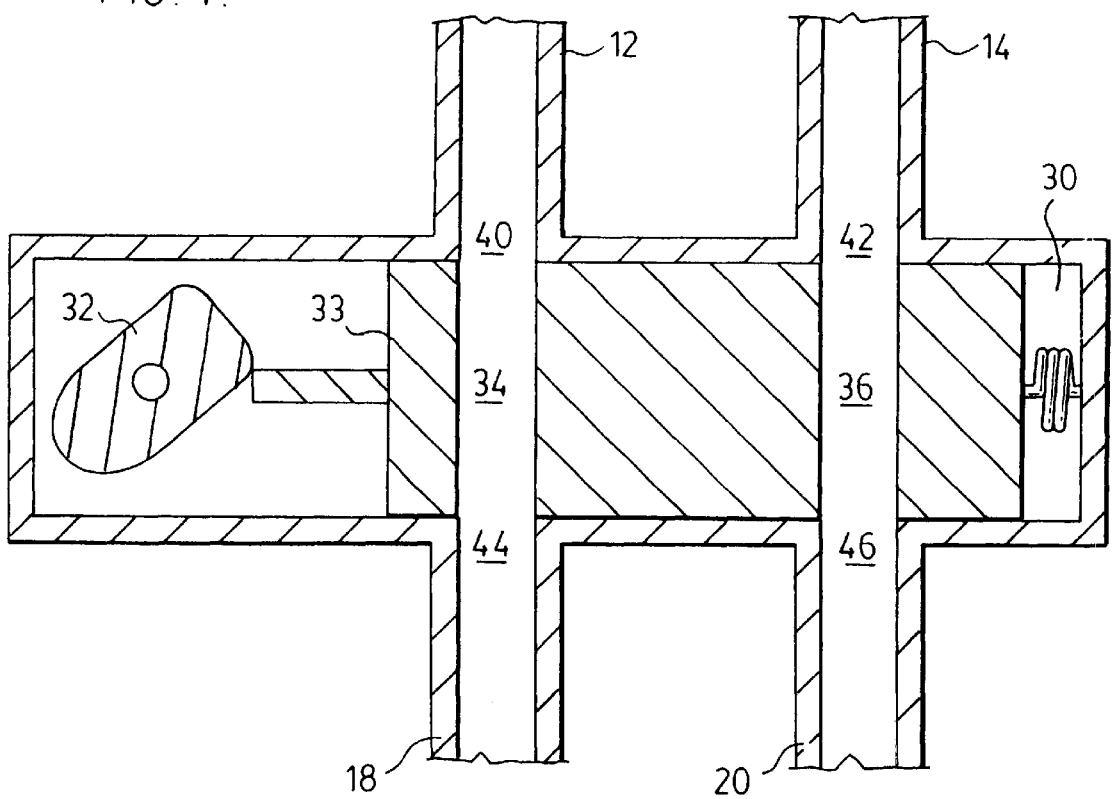

LAUNDRY FAUCET VALVE AND TIMER CONTROL

BACKGROUND OF THE INVENTION

1. Field of the Invention

The present invention relates to installations for domestic appliances, and more particularly to a valve for use with a washing machine.

2. Description of the Prior Art

Some domestic appliances, such as washing machines, must be connected to sources of hot and cold water. While the supply lines are generally made of copper, the connection to the washing machine is usually made with rubber hoses through manual valves on the copper supply lines. During use the hoses are subjected to pressure pulses, and if the water supply is left on between washes, there is a continual pressure in the rubber hoses. Over a period of time, the hoses are prone to leakage and damage which typically is a sudden rather than progressive failure. Accordingly, there is high likelihood of a leak developing in such hoses, which effectively provides an open water outlet. The user could turn off the manual water taps after each load of laundry to isolate the hoses, however, this imposes a burden on the user to remember to turn off the taps after each load of laundry. If the user forgets to turn off the water, than a leak could develop and cause severe damage.

In an attempt to prevent such leakage, U.S. Pat. No. 4,930,549, provides a hose protector device with sleeves over the pipes in order to direct any leakage to a drain. Such a device redirects the flow of leaked water from a ruptured hose to a drain. If the hose breaks, then water will be wasted and could overflow the drain or rupture the hose protector.

Another solution, proposed in U.S. Pat. No. 5,992,218, is a device for shutting off the supply of water to a washing machine when a leak develops. The valve is electrically controlled and controls both the hot and cold water taps. The water supply lines have an extra electrically conductive layer which when covered with water changes the resistance of this layer to activate a switch and turn off the water and the electricity to the washing machine. Such a device relies on electricity to operate and requires a special layer on the pipes. It also requires an extra electrical connection and the corresponding wires to connect to the conductive layer. Any failure in the detection circuitry or the electrical controls for the valves would allow water to leak.

Accordingly, there is a need for a valve for washing machines, which obviates and mitigates at least some of the above disadvantages.

SUMMARY OF THE INVENTION

A valve for an appliance comprises:
a) a valve assembly having a pair of inlets for coupling to a water supply and a pair of outlets for supplying water to the appliance;
b) a valve mechanism operably coupled to the valve assembly to control the flow of water from the inlets to the outlets,
c) a timer operably coupled to the valve mechanism to control the valve mechanism and thereby control the flow of water;
wherein enabling the timer allows water to flow from the inlets to the outlets for a preset length of time.

BRIEF DESCRIPTION OF THE DRAWINGS

These and other features of the preferred embodiments of the invention will become more apparent in the following detailed description in which reference is made by way of example only to the appended drawings wherein:

FIG. 4 is a view of the valve of FIG. 3 in an alternate position.

DESCRIPTION OF THE PREFERRED EMBODIMENTS

Figure 1:
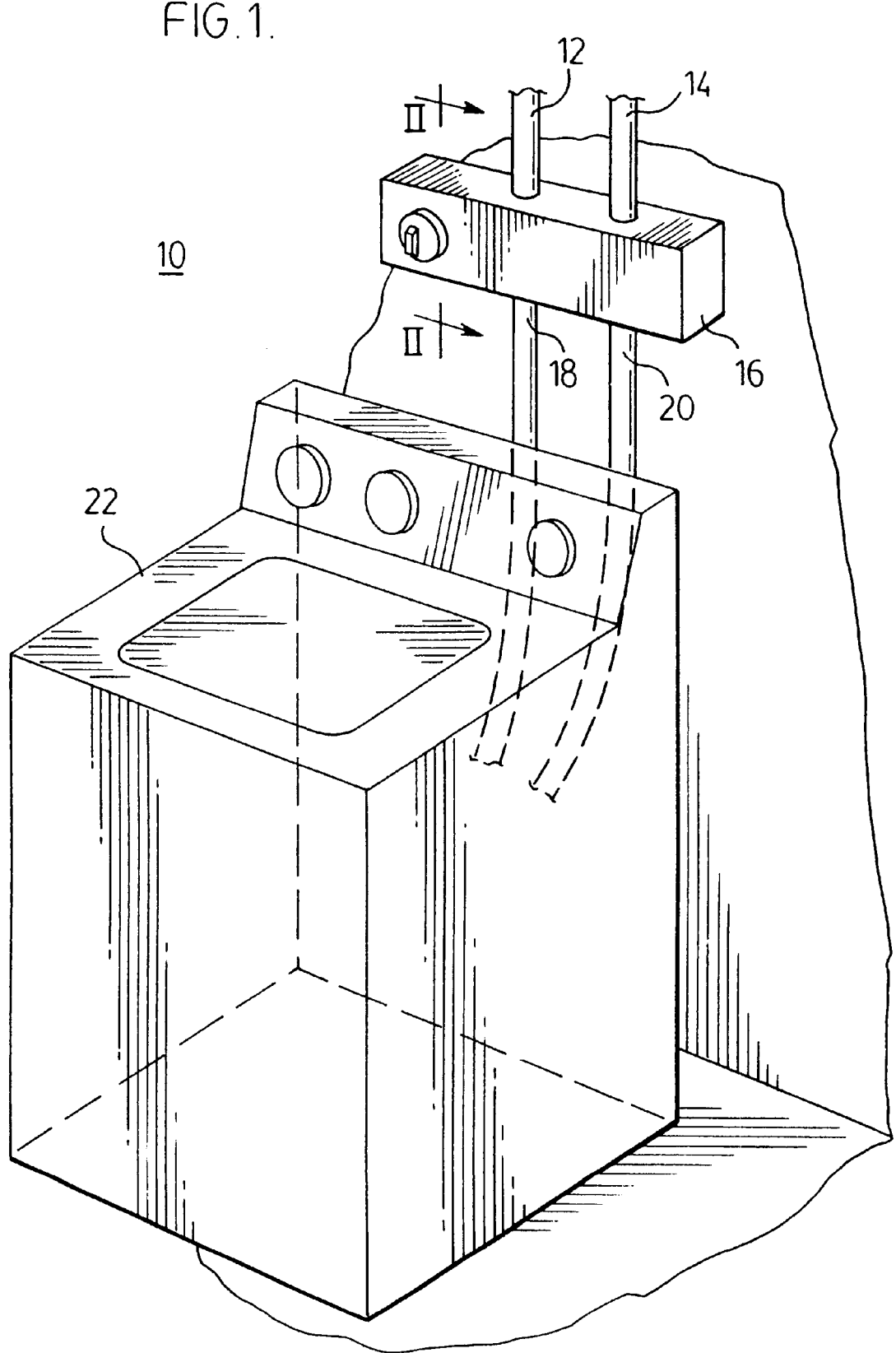
FIG. 1 is a perspective view of a washing machine installation.

Referring to FIG. 1, a washing machine installation is shown generally by the numeral 10. A pair of supply lines 12, 14 supply hot and cold water respectively to the machine. The supply lines run through the valve assembly 16 to provide water to a pair of rubber hoses 18, 20. The rubber hoses 18, 20 are connected to respective inlet ports of a washing machine 22.

Figure 2:
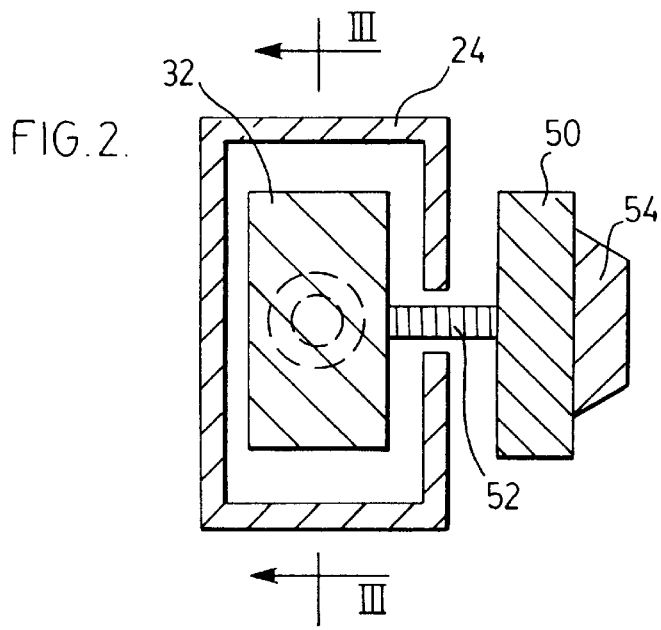
FIG. 2 is a sectional view along the line II—II of the valve shown in FIG. 1.
Figure 3:
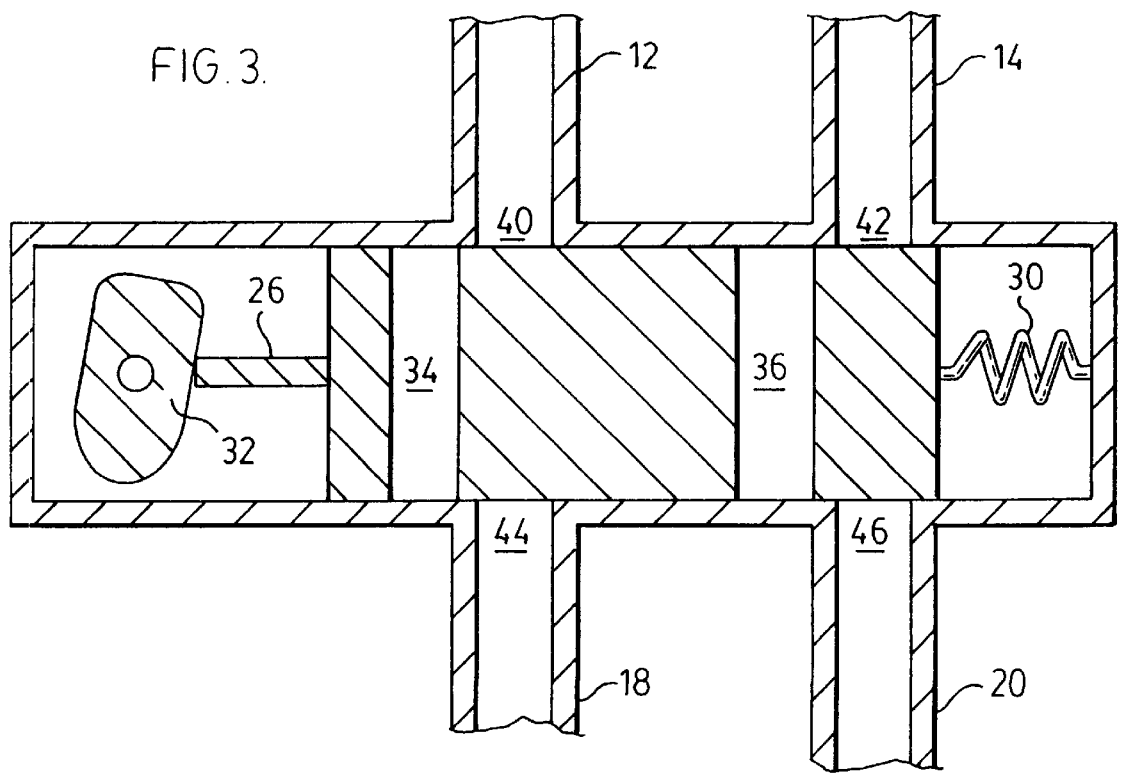
FIG. 3 is a sectional view along the line III—III of the valve shown in FIG. 1.

Referring to FIGS. 2 and 3, the valve assembly 16 includes a housing 24 having a pair of inlet ports 40, 42 and a pair of outlet ports 44, 46. The valve assembly 16 includes a valve member 26 with a pair of orifices 34, 36. A spring 30 acts between the valve member 26 and the housing 24 to bias the valve member 26 to a closed position shown in FIG. 3. Movement of the valve member 26 is controlled by a cam member 32. The cam member 32 is mounted on a shaft 52, thereby defining an axis of rotation of the cam member 32. The shaft 52 passes through the housing 24 and connects to a mechanical timer 50 mounted on the housing 24. A knob 54 is attached to the timer 50 in order to set a countdown on the timer.

In operation, the mechanical timer 50 is set to a preset amount of time using the knob 54. Setting the timer turns the shaft 52 to rotate the cam 32 and thereby move the valve member 26 from the closed position to an open position shown in FIG. 4. In the open position, the orifice 34 in the valve member 26 is aligned with the pair of ports 40 and 44, and the orifice 36 in the valve member 26 is aligned with the pair of ports 42 and 46. This allows the water to flow from the port 40 through the orifice 34 to the outlet 44, and from the port 42 through the orifice 36 to the outlet 46, without the two sources of liquid mixing. As the mechanical timer 50 counts down, it rotates the cam 32 to slide the valve member 26 toward the closed position. When the preset time has elapsed, the mechanical timer 50 rotates the cam 32 to its original position. The force of the spring 30 moves the valve member 26 to the closed position.

Preferably, the configuration of the cam is selected to hold the valve fully open while the mechanical timer is on, then move instantaneously to release the valve into the closed position when the preset time elapses. Such a configuration is achieved by having a constant radius on the portion of the cam corresponding to the on position to hold the valve fully open. There is an increasing radius on the portion of the cam corresponding to the transition from on to off to release the valve into the closed position when the preset time elapses.

To operate the valve, the mechanical timer is set to the preset amount of time, preferably six hours. Once the mechanical timer is set, it will allow water to flow into the rubber hoses for the preset amount of time. When this preset time has lapsed, the mechanical timer moves the cam into the transition portion, which allows the valve to close and stop the flow of water into the rubber hoses. Accordingly, the overall life of the rubber hoses may be extended, as they are not pressurized all the time. Even if a leak did occur, then the leak would be limited to the preset time period.

In a further embodiment, the mechanical timer 50 includes manual on and off positions, for manual control of the timer. This provides an override of the clock in the timer. Such an override could be used if the user notices a leak and wishes to immediately stop the water, rather than wait for the preset time to elapse. The timer could be placed in the "manual on" position for testing purposes or if the valve were temporarily used for another purpose.

In a still further embodiment, a manual override is provided to bypass the mechanical timer 50 and operate the cam member 32 directly. Such an override could be used if the mechanical timer 50 became inoperable, as it effectively disables the mechanical timer.

In a yet further embodiment, the preset time may be adjusted within a specific range. Preferably this range is 0 hours to 6 hours, however it is anticipated that certain uses will require different limits. During installation or when required by the user, the preset time may be adjusted to an appropriate value for the particular application.

Although the invention has been described with reference to certain specific embodiments, various modifications thereof will be apparent to those skilled in the art without departing from the spirit and scope of the invention as outlined in the claims appended hereto.

For example, other types of pipes may be used for the various connections. The valve provides a safeguard against the leakage in the second set of pipes, regardless of their particular construction or configuration.

The valve mechanism is not limited to a linear motion, but could be rotary as well.

It will also be understood that such a device may be used with any domestic appliance that uses two water supplies. These water supplies do not necessarily need to be hot and cold water, but rather simply liquids whose leakage it is wished to limit in the event of a leak.

What is claimed is:

1. A valve for controlling a flow of water to an appliance comprising:
   a) a valve assembly having a pair of inlets for coupling to a water supply and a pair of outlets for supplying water to said appliance;
   b) a valve mechanism operably coupled to said valve assembly to control the flow of water from said inlets to said outlets,
   c) a timer operably coupled to said valve mechanism to control said valve mechanism and thereby control said flow of water;
   wherein enabling said timer allows water to flow from said inlets to said outlets for a preset length of time.

2. A valve according to claim 1, further comprising an override to control said flow of water, said timer being disabled by said override.

3. A valve according to claim 1, wherein said timer provides a position for manual control of said flow of water.

4. A valve according to claim 3, said position for manual control of said flow of water being an off position.

5. A valve according to claim 3, said position for manual control of said flow of water being an on position.

* * * * *